United States Patent
Overstreet

(10) Patent No.: US 7,621,347 B2
(45) Date of Patent: Nov. 24, 2009

(54) BIT LEG AND CONE HARDFACING FOR EARTH-BORING BIT

(75) Inventor: James L. Overstreet, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 267 days.

(21) Appl. No.: 11/377,588

(22) Filed: Mar. 16, 2006

(65) Prior Publication Data

US 2006/0207803 A1    Sep. 21, 2006

Related U.S. Application Data

(60) Provisional application No. 60/662,833, filed on Mar. 17, 2005.

(51) Int. Cl.
*E21B 10/46* (2006.01)
(52) U.S. Cl. ...................... 175/374; 175/425
(58) Field of Classification Search ................. 175/374, 175/425
See application file for complete search history.

(56) References Cited

U.S. PATENT DOCUMENTS

| 5,492,186 | A | * | 2/1996 | Overstreet et al. | ......... 175/374 |
| 6,124,564 | A | | 9/2000 | Sue et al. | |
| 6,138,779 | A | * | 10/2000 | Boyce | ......... 175/374 |
| 6,659,206 | B2 | | 12/2003 | Liang et al. | |
| 6,663,688 | B2 | | 12/2003 | Findeisen et al. | |
| 2005/0109545 | A1 | * | 5/2005 | Lockwood et al. | ......... 175/374 |
| 2006/0005662 | A1 | | 1/2006 | Lockwood et al. | |

OTHER PUBLICATIONS

Plasma Transferred Arc Overlays Reduce Operating Costs in Oil Sand Processing, D. Harper, M. Gill, K.W.D. Hart, Eutectic Canada Inc., Edmonton, Alberta, Canada—M. Anderson, Syncrude Canada Ltd., Edmonton, Alberta, Canada, 7 pages.
Effects of Microstructure on Wear of WC/NI PTA Coatings, J.W. Newkirk and J. Bao, U. of Missouri-Rolla, Rolla, MO, pp. 563-569.

* cited by examiner

*Primary Examiner*—Jennifer H Gay
*Assistant Examiner*—Brad Harcourt
(74) *Attorney, Agent, or Firm*—Bracewell & Giuliani LLP

(57) ABSTRACT

An earth-boring bit has a bit body, and a bit leg depending from the bit body with a circumferentially extending outer surface, a leading side and a trailing side. A cone is rotatably mounted on a cantilevered bearing shaft depending inwardly from the bit leg. A first layer of a hardfacing composition of carbide particles dispersed in a nickel-based matrix is formed on the bit leg. A second layer of a hardfacing composition of carbide particles dispersed in an iron-based matrix that is formed on the cone. The first layer of hardfacing is applied by conveying carbide particles in a nickel-based matrix through a pulsed plasma transferred arc process. The second layer of hardfacing is applied with a torch and a hardfacing tube comprising carbide particles held within an iron-based tube.

14 Claims, 3 Drawing Sheets

BIT LEG AND CONE HARDFACING FOR EARTH-BORING BIT

RELATED APPLICATIONS

This nonprovisional patent application claims the benefit of provisional patent application U.S. Ser. No. 60/662,833, filed on Mar. 17, 2005, which is hereby incorporated by reference in its entirety.

BACKGROUND OF THE INVENTION

1. Field of the Invention

This invention relates in general to hardfacing, and in particular to hardfacing applied to bit legs and cones of a rolling cone earth-boring bit.

2. Background of the Art

In drilling bore holes in earthen formations by the rotary method, rock bits fitted with one, two, or three rolling cutters or cones are employed. The bit is secured to the lower end of a drillstring that is rotated from the surface, or the bit is rotated by downhole motors or turbines. The cutters or cones mounted on the bit roll and slide upon the bottom of the bore hole as the bit is rotated, thereby engaging and disengaging the formation material to be removed. The rolling cutters are provided with cutting elements or teeth that are forced to penetrate and gouge the bottom of the borehole by weight of the drillstring. The cuttings from the bottom sidewalls of the borehole are washed away by drilling fluid that is pumped down from the surface through the hollow drillstring. A rounded end of the bit leg that corresponds with the cutter is commonly referred to as a shirttail.

Before the cuttings are washed away, the cuttings slide over portions of the drill bit while the bit is rotating. The cuttings are abrasive and can cause wear on the surfaces of the drill bit, which can eventually lead to failure. When faced with wear problems, especially in the art of the cutting elements on the cutters, it has been common in the arts since at least the 1930s to provide a layer of wear-resistance metallurgical material called "hardfacing" over those portions of the teeth exposed to the most severe wear. The hardfacing typically consists of extremely hard particles, such as sintered, cast, or macrocrystalline tungsten carbide, dispersed in a metal matrix. Such hardfacing materials are applied by welding a metallic matrix to the surface to be hardfaced.

A typical technique for applying hardfacing to the cutting elements by oxyacetylene or atomic hydrogen welding. A welding rod or stick is typically formed as a tube of mild steel sheet enclosing a filler that mainly comprises carbide particles. The filler may also include deoxidizer for the steel, flux and a resin binder. The hardfacing is applied by melting an end of the rod on the face of the tooth. The steel tube melts as it is welded to the steel tooth and provides the matrix for the carbide particles. The deoxidizer alloys with the mild steel of the tube.

Increased wear resistance of hardfacing is desirable to lengthen distance the drill bit can drill before dulling. Wear resistance also allows the drill bit to cut more efficiently, and therefore faster, to such depths. Accordingly, the benefits from increased wear resistance reduce the costs drilling in both parts and time.

BRIEF SUMMARY OF THE INVENTION

An earth-boring bit has a bit body and a bit leg depending from the bit body. The bit leg has a circumferentially extending outer surface, a leading side and a trailing side. A cone is rotatably mounted on a cantilevered bearing shaft depending inwardly from the bit leg. A first layer of a hardfacing composition of carbide particles dispersed in a nickel-based matrix is formed on the bit leg. Such first layer defines a first hardfacing layer. The earth-boring bit also has a second layer of a hardfacing composition of carbide particles dispersed in an iron-based matrix that is formed on the cone. Such second layer defines a second hardfacing layer.

A shirttail can be defined along an edge of the bit leg that corresponds with the cone. At least a portion of the first layer of hardfacing can be formed on the shirttail.

The cone can also have a plurality of teeth on the cone, and the second hardfacing layer can also be formed on at least a portion of the teeth.

The cone can have a plurality of teeth, and the second hardfacing layer can be formed on at least a portion of the teeth. The cone can also have a gage surface, and a gage hardfacing layer that is formed the gage surface and is selected from a group consisting of the first hardfacing layer and the second hardfacing layer. The gage hardfacing layer can be the first hardfacing layer. The gage hardfacing layer can also be the second hardfacing layer.

The first hardfacing layer can also be formed on the leading side of the bit leg. The first hardfacing layer can extend from the shirttail along the leading side of the bit leg. The first hardfacing layer can also be formed on the leading side of the bit leg, and extend toward the trailing side of the bit leg.

The first hardfacing layer can have sintered carbide pellets in a size range between about 37 to about 420 microns in diameter, or in a size range between about 75 to about 177 microns in diameter. The first hardfacing layer can have spherical cast carbide pellets in a size range between about 45 to about 160 microns in diameter and spherical sintered carbide pellets in a size range between about 75 to about 177 microns in diameter.

The first hardfacing layer can have spherical cast carbide pellets in a size range between about 45 to about 160 microns in diameter and sintered carbide pellets in a size range between about 75 to about 177 microns in diameter, while the second hardfacing layer has spherical sintered carbide pellets in a size range between about 590 to about 1190 microns in diameter.

A method of manufacturing the earth-boring bit includes the step of applying a bit leg layer of hardfacing composition by conveying carbide particles dispersed in a nickel-based matrix to the bit leg through a pulsed plasma transferred arc process. The method also includes applying a cone layer of hardfacing composition to the cone with a torch and a hardfacing tube comprising carbide particles held within an iron-based tube.

The applying a bit leg layer of hardfacing composition can include flowing a mixture comprising sintered carbide pellets in a size range between about 37 to about 420 microns in diameter, nickel, and an inert gas through an annular passage surrounding an electrode to an orifice. The applying a bit leg layer of hardfacing composition can also include melting the mixture into a plasma hardfacing composition that lands on the bit leg by forming an electrical arc between the bit leg and the electrode when the orifice is near the bit leg. In such a method, a plurality of spherical cast carbide pellets between about 45 to about 160 microns in diameter can flow with the mixture through the annular passage and the orifice to be melted with the electrical arc.

In the applying a cone layer of hardfacing composition step, the carbide particles can have spherical sintered carbide pellets in a size range between about 590 to about 1190 microns in diameter, and spherical cast carbide pellets in a size range between about 177 to about 250 microns in diameter.

Alternatively, an earth-boring bit can have a bit body with a bit leg depending from the bit body. The bit leg has a circumferentially extending outer surface, a leading side and a trailing side. A cone is rotatably mounted on a cantilevered bearing shaft depending inwardly from of the bit leg. A shirttail is defined along an edge of the bit leg that corresponds with the cone. A plurality of teeth are on the cone. A shirttail layer of a hardfacing composition of carbide particles dispersed in a nickel-based matrix is formed on the shirttail. A leading side layer of a hardfacing composition of carbide particles dispersed in a nickel-based matrix is formed on the leading side of the bit leg. Finally, the earth-boring bit also has a teeth layer of a hardfacing composition of carbide particles dispersed in an iron-based matrix that is formed on at least a selection portion of the plurality of teeth.

The teeth of the earth-boring bit can have a heel row of teeth having a gage surface. The earth-boring bit can also have a gage layer of a hardfacing composition of carbide particles dispersed in a nickel-based matrix is formed on the gage surface.

All of the carbide particles in the shirttail and leading side layers of hardfacing composition can be less than 420 microns in diameter. All of the carbide particles in the shirttail and leading side layers of hardfacing composition can also be less than 177 microns in diameter.

All of the carbide particles in the shirttail and leading side layers of hardfacing composition are less than 177 microns in diameter, and at least some of the carbide particles in the teeth layer of a hardfacing composition are greater than 177 microns in diameter.

DETAILED DESCRIPTION OF THE PREFERRED EMBODIMENT

Figure 1:
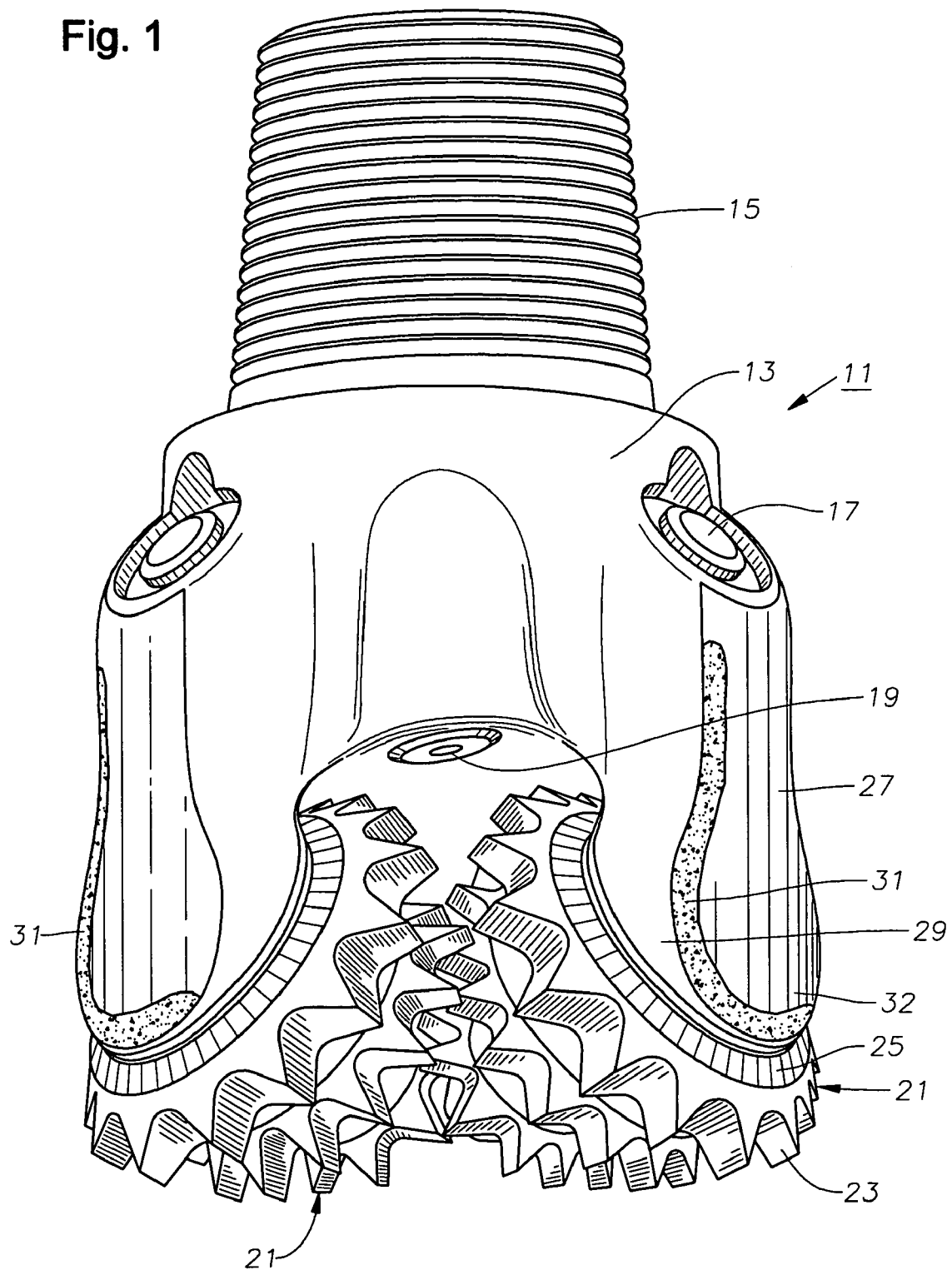
FIG. 1 is a side elevational view illustrating a bit having hardfacing in accordance with this invention.

Referring to FIG. 1, an earth-boring bit 11 according to the present invention has a bit body 13. Bit body 13 has a set of threads 15 at its upper end for connecting the bit into a drill string (not shown). Bit body 11 has three lubricant compensators 17 for reducing pressure differential between lubricant in the bit and drilling fluid pressure on the exterior of the bit. At least one nozzle 19 is provided in bit body 13 for directing pressurized drilling fluid from within the drill string to return cuttings and cool bit 11. One or more cutters or cones 21 are rotatably secured to bit body 13. Typically, each bit 11 has three cones 21, and one of the cones 21 is obscured from view in FIG. 1.

Each cone 21 has a generally conical configuration containing a plurality of teeth 23 in circumferential rows. In this embodiment, teeth 23 are machined or milled from the support metal of cone 21. Alternately, teeth 23 may be tungsten carbide compacts that are press-fitted into mating holes in the support metal of the cone. Each cone 21 has a gage surface 25 at its base that defines the gage or diameter of bit 11.

Body 13 is made up of three head sections welded together. Each head section has a bit leg 27 that extends downward from body 13 and supports one of the cones 21. Bit legs 27 and head sections have outer surfaces that are segments of a circle that define the outer diameter of bit 11. Recessed areas 29 locate between each bit leg 27, the recessed areas being less than the outer diameter of body 13 to create channels for the return of drilling fluid and cuttings.

Bit leg hardfacing 31 is applied to portions of each head section and its bit leg 27. The pattern of bit leg hardfacing 31 may differ. Various patterns of bit leg hardfacing 31 are taught in U.S. patent application Ser. No. 10/902,222, filed on Jul. 29, 2004, and published on Feb. 2, 2006 as U.S. Publication No. US2006/0021800, which is incorporated herein in its entirety by reference. In this example, bit leg hardfacing 31 comprises a bead that extends downward from near compensator 17 along a leading edge of the head section and bit leg 27 to the lower edge or shirttail 32 of each bit leg 27. The lower portion of bit leg hardfacing 31 curves to follow the contour of shirttail 32. The overall configuration in this example of bit leg hardfacing 31 is in the shape of a hook. It should be readily apparent to those skilled in the art that hardfacing 31 can have several pattern variations, including those from which hardfacing 31 extends from a leading side of bit leg 27 toward a trailing side of bit leg 27.

Figure 2:
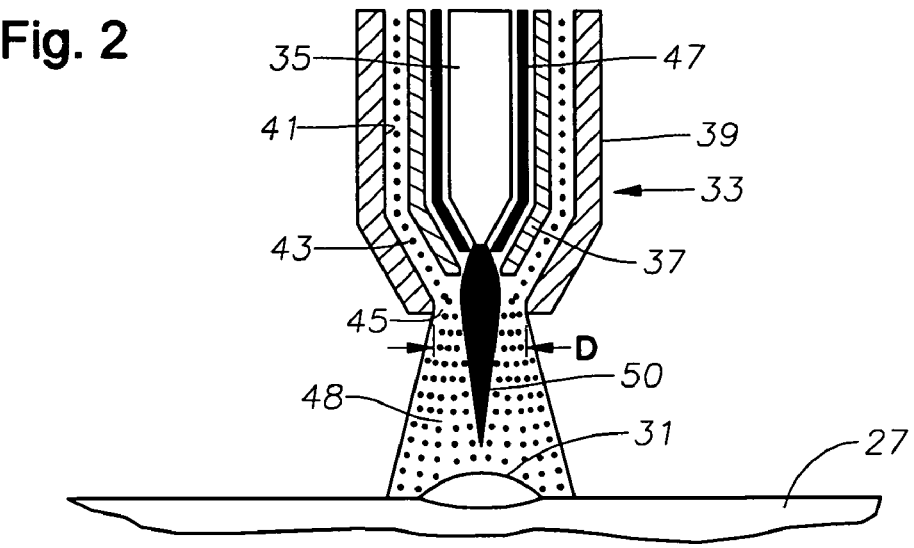
FIG. 2 is a schematic sectional view illustrating hardfacing being applied to a bit leg.

Referring to FIG. 2, in the preferred embodiment, bit leg hardfacing 31 is applied in a multi-axis automated process by a torch 33, although it could be applied manually. Torch 33 applies bit leg hardfacing 31 in the selected pattern. Torch 33 is operated in a conventional manner known as pulsed plasma transferred arc process (PPTA). Torch 33 has an electrode 35 located within an inner tube 37. An outer tube 39 extends around inner tube 37, defining an annular passage 41. Powdered hardfacing material 43 and an inert gas are fed from a hopper (not shown) down annular passage 41. An orifice 45 with a diameter D is located at the lower end of annular passage 41. A shielding gas 47 flows downward between electrode 35 and inner tube 33. Pulsed DC current supplied between electrode 35 and bit leg 27 creates an arc 50, which creates a plasma stream 48 that contains the powdered hardfacing material 43.

Hardfacing material 43 is made up of matrix metal alloy particles and carbide particles. To applicant's knowledge, in the PPTA prior art applications on the outer circumference of drill bit head sections, the carbide particles comprised only cast tungsten carbide particles or mono crystalline carbide particles. Sintered or cemented tungsten carbide pellets 49 (FIG. 3) are also employed in this application, and to applicant's knowledge, have not been used in the past on PPTA hardfacing applications on the outer circumference of drill bits. Sintered or cemented carbide pellets 49 are shown as the lighter colored particles in FIG. 3 and comprise crystals of particles of tungsten carbide sintered together with a binder, usually cobalt. The content of the binder may vary, and in one embodiment, the binder comprises 6% cobalt. Preferably, sintered carbide pellets 49 have a generally spherical shape. Sintered carbide pellets 49 are not truly spherical, but lack sharp edges, corners and angular projections commonly found in crushed or other non-spherical carbide grains or particles. These surface irregularities cause the particles to possess residual stresses and may melt during application of the hardfacing composition, degrading the properties of the hardfacing. Generally spherical pellets are believed to have reduced levels of residual stress and generally do not possess irregularities that are believed to melt during applications.

Sintered carbide pellets have been employed for non-PPTA hardfacing applications on drill bits in the past, but in larger sizes. Sintered carbide pellets 49 in this application must be small enough to not clog up orifice 45. Preferably, the largest size of sintered carbide pellets 49 has a maximum diameter less than half of diameter D of orifice 45. Diameter D may vary, and is 0.045 inch in one example. The desired size range for sintered carbide pellets 49 is approximately 37 to 420 microns (0.001"=25.4 microns) in diameter, and more preferably 75 to 177 microns. In the preferred size range a mesh screen size is −60+200 mesh. That designation means that the particles being retained will fall through a 60 mesh screen, but not pass through a 200 mesh screen.

Figure 3:
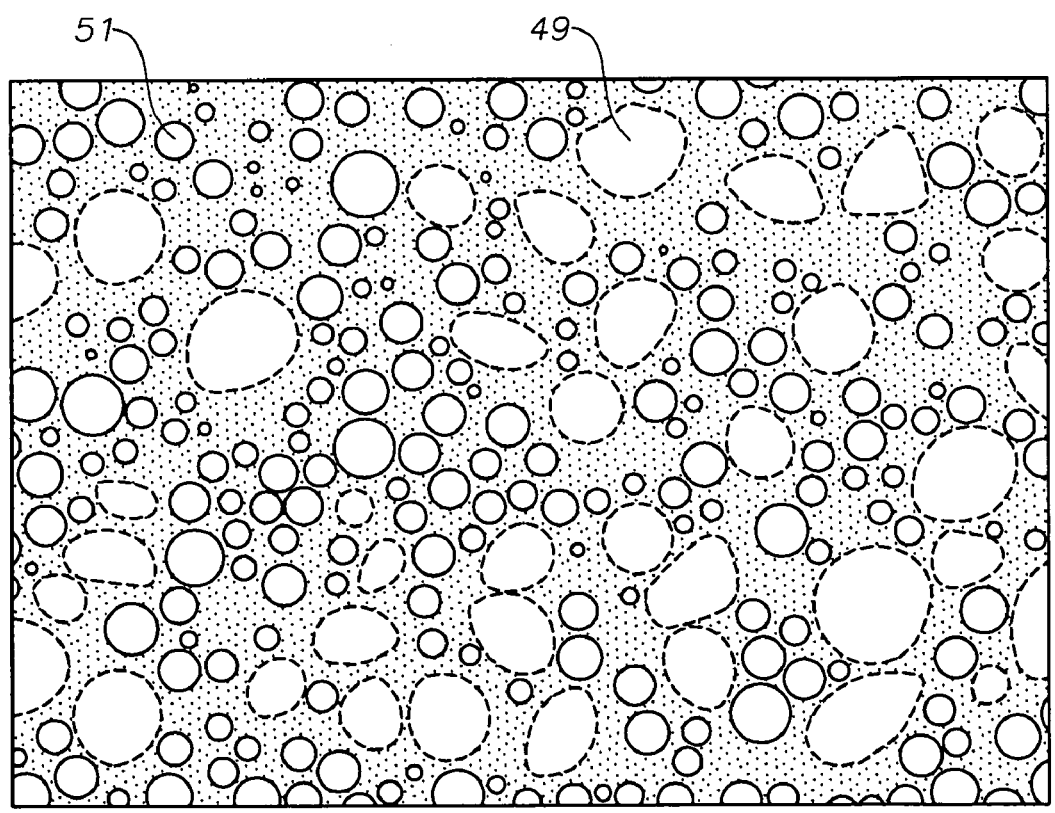
FIG. 3 is a photomicrograph of the hardfacing being applied in FIG. 2.

As mentioned above, hardfacing materials 43 also include spherical cast pellets 51, which are also shown in FIG. 3. Spherical cast pellets 51 are conventional and of a conventional size for application with torch 33. Spherical cast pellets 51 are generally more spherical than sintered carbide pellets 49 and also small enough to avoid clogging annular passage 41 of torch 33. In the preferred embodiment, spherical cast pellets 51 are from 45 to 160 microns in diameter, but this range can vary. The relative proportion of spherical cast pellets 51 to sintered pellets 49 may differ upon application. In one embodiment, the ratio was 25% spherical cast pellets 49 and 75% sintered carbide pellets 51 by weight, but that ratio could be reversed.

Hardfacing material 43 also includes alloy metal particles for serving as the matrix of hardfacing 31. The alloy particles are not shown in the photomicrograph of FIG. 3 because they melt in the plasma column and form the matrix or supporting metal that holds pellets 49 and 51. Prior to melting, the metal alloy particles are approximately 37 to 150 microns in average maximum diameter. The amount of alloy metal particles by weight can vary, however it is normally considerably less than the weight of the combined carbide 49, 51. Preferably, carbide pellets 49, 51 form 60% to 80% by weight of the total hardfacing material 43 flowing down annular passage 41.

Alloy metal particles may differ in their primary metal. In one embodiment, the primary metal is nickel, although iron could also be used. When nickel is the primary metal of the alloy metal particles, the matrix is nickel-based. When iron is the primary metal of the alloy metal particles, the matrix is iron-based. Nickel has a lower melting point than iron. This allows the operator to configure torch 33 to either traverse faster or operate at a lower temperature. Tests have shown that an iron-based alloy, which melts at a higher temperature than nickel, tends to infuse into sintered carbide pellets, which is detrimental. However, nickel has less toughness than iron or is generally less resistant to high force impacts, thus may not be able to retain carbide particles 49, 51 as well in high impact applications. Referring to FIG. 1, bit leg hardfacing 31 is in an area of lower impact than other parts of the bit, particularly teeth 23. However, the surrounding earth formation can be extremely abrasive. The use of a nickel-based matrix, rather than an iron-based, is quite suitable for abrasion resistance, although a nickel-based matrix could be a detriment to hardfacing in high impact areas.

The alloy metal particles will have other elements contained within each particle, and that may vary both in the type of elements and the relative amount. Preferably, in the nickel-based matrix, the alloy metal particles include 1%-5% boron, generally around 3%; 1%-5% silicon, typically around 3%; and 0%-8% chromium, with the balance being nickel. Also, a small percentage of iron could be added to the nickel, such as ¹⁄₁₀ of 1%. In the iron-based matrix, the alloy metal particles may include vanadium carbide or other carbides in a range that can vary, such as from 0.5%-35%.

In the operation of torch 30, DC current is applied between electrode 35 and bit leg 27. When current is supplied, arc 50 creates a very hot plasma stream 48 containing hardfacing powders 43. The hardfacing powders 43 form hardfacing 31 on bit leg 27. The current is pulsed on and off at a selected frequency in a conventional manner.

Hardfacing such as hardfacing 31 could also be applied to the cone gage surfaces 25. Gage surfaces 25 are in an area of high abrasive wear, but the impact on gage surfaces 25 is not severe, thus a nickel-based alloy hardfacing could be utilized, as described above. Hardfacing on gage surfaces 25 in accordance with the above-described method could be performed on both bits with milled-teeth cones, such as cones 21 shown in FIG. 1, and on bits with tungsten carbide compacts. It should be apparent to those skilled in the art that hardfacing on gage surface 25 can also be nickel-based or iron-based as in the above-discussed example.

Figure 4:
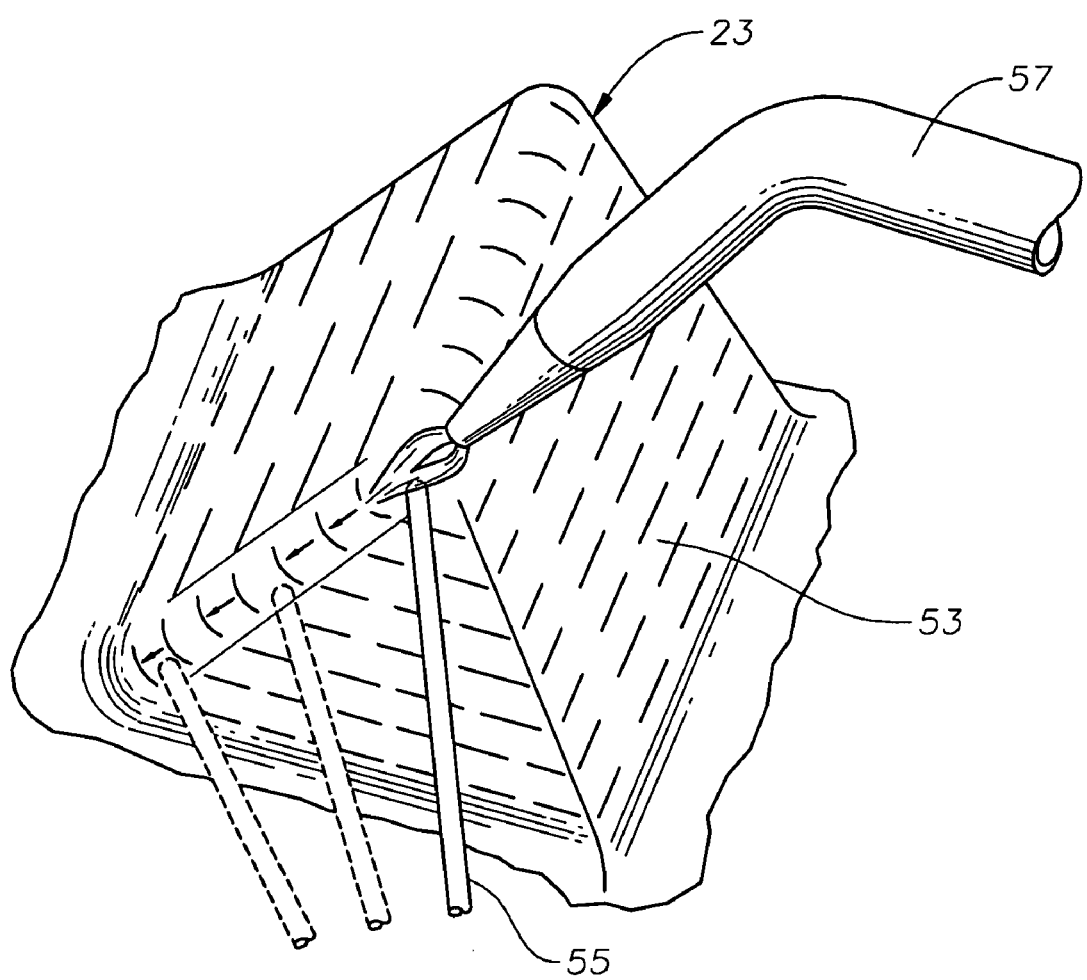
FIG. 4 is a perspective view illustrating hardfacing being applied to a tooth of a cone of the bit of FIG. 1.

Referring to FIG. 4, one high impact area is the hardfacing 53 contained on teeth 23 (FIG. 1), and this hardfacing preferably has an iron-based alloy rather than nickel-based. Hardfacing 53 may be of a prior art type. In this embodiment, hardfacing 53 is applied in a conventional manual manner using a hardfacing tube 55 and an oxyacetylene torch 57. Tube 55 contains filler, which is a desired mixture of hardfacing materials, and the surrounding metal of tube 55 serves as the matrix or alloy metal. The hardfacing materials in tube 55 may vary widely. In one example, the hardfacing material may include the following:

−16/+20 mesh (between about 820 and 1190 microns) sintered tungsten carbide spherical pellets—approximately 33%

−20/+30 mesh (between about 590 and 840 microns) sintered tungsten carbide spherical pellets—approximately 35%

−20/+30 mesh (between about 590 and 840 microns) crushed sintered tungsten carbide—approximately 15%

−60/+85 mesh (between about 250 and 177 microns) spherical cast tungsten carbide—approximately 15%

Also, additional elements are normally contained in the tube, such as silicomanganese and niobium. The weight percentage of hardfacing particles to the alloy metal of tube 55 is preferably in the range from 67% to 71% by weight.

While the invention has been shown in some of its forms, it should be apparent to those skilled in the art that it is not so limited, but is susceptible to various changes without departing from the scope of the invention.

That claimed is:

1. An earth-boring bit comprising:
   a bit body;
   a bit leg depending from the bit body and having a circumferentially extending outer surface, a leading side and a trailing side;
   a cone rotatably mounted on a cantilevered bearing shaft depending inwardly from the bit leg;
   a first layer formed on the bit leg of a hardfacing composition of carbide particles dispersed in a nickel-based matrix, defining a first hardfacing layer wherein nickel comprises a primary metal of the nickel-based matrix; and
   a second layer formed on the cone of a hardfacing composition of carbide particles dispersed in an iron-based matrix, defining a second hardfacing layer wherein iron comprises a primary metal of the iron-based matrix.

2. The earth-boring bit of claim 1, further comprising a shirttail being defined along an edge of the bit leg that corresponds with the cone, and at least a portion of the first layer of hardfacing is formed on the shirttail.

3. The earth-boring bit of claim 1, wherein the cone further comprises a plurality of teeth on the cone, and the second hardfacing layer is also formed on at least a portion of the teeth.

4. The earth-boring bit of claim 3, wherein the gage hardfacing layer comprises the first hardfacing layer.

5. The earth-boring bit of claim 1, wherein the cone further comprises a gage surface, and a gage hardfacing layer selected from a group consisting of the first hardfacing layer and the second hardfacing layer is formed the gage surface.

6. The earth-boring bit of claim 1, wherein the first hardfacing layer is formed on the leading side of the bit leg and extends toward the trailing side of the bit leg.

7. The earth-boring bit of claim 1, wherein the first hardfacing layer extends from the shirttail along the leading side of the bit leg.

8. The earth-boring bit of claim 1, wherein the first hardfacing layer comprises sintered carbide pellets in a size range between about 37 to about 420 microns in diameter, each pellet comprising tungsten carbide within a binder of cobalt.

9. The earth-boring bit of claim 1, the first hardfacing layer comprises sintered carbide pellets in a size range between about 75 to about 177 microns in diameter, each pellet comprising tungsten carbide within a binder of cobalt.

10. The earth-boring bit of claim 1, wherein the first hardfacing layer comprises spherical cast carbide pellets in a size range between about 45 to about 160 microns in diameter and spherical sintered carbide pellets in a size range between about 75 to about 177 microns in diameter.

11. The earth-boring bit of claim 1, wherein:
the first hardfacing layer comprises spherical cast carbide pellets in a size range between about 45 to about 160 microns in diameter and sintered carbide pellets in a size range between about 75 to about 177 microns in diameter; and
the second hardfacing layer comprises spherical sintered carbide pellets in a size range between about 590 to about 1190 microns in diameter.

12. The earth-boring bit of claim 1, wherein:
the first hardfacing layer comprises spherical cast carbide pellets in a size range between about 45 to about 160 microns in diameter and sintered carbide pellets in a size range between about 75 to about 177 microns in diameter; and
the second hardfacing layer comprises spherical sintered carbide pellets in a size range between about 590 to about 1190 microns in diameter, and spherical cast carbide pellets in a size range between about 177 to about 250 microns in diameter.

13. An earth-boring bit comprising:
a bit body;
a bit leg depending from the bit body and having a circumferentially extending outer surface, a leading side and a trailing side;
a cone rotatably mounted on a cantilevered bearing shaft depending inwardly from the bit leg;
a shirttail being defined along an edge of the bit leg that corresponds with the cone;
a layer of hardfacing formed on the shirttail, the hardfacing having a composition of carbide particles dispersed in a nickel-based matrix, defining a first hardfacing layer that contains more nickel than any other metal;
a plurality of teeth on the cone; and
a layer formed on at least a portion of the teeth of a hardfacing composition of carbide particles dispersed in an iron-based matrix, defining a second hardfacing layer that contains more iron than any other metal.

14. An earth-boring bit comprising:
a bit body;
a bit leg depending from the bit body and having a circumferentially extending outer surface, a leading side and a trailing side;
a cone rotatably mounted on a cantilevered bearing shaft depending inwardly from the bit leg;
a layer formed on the bit leg of a hardfacing composition of sintered tungsten carbide pellets less than about 177 microns in diameter dispersed in a nickel-based matrix consisting essentially of nickel; and
a layer formed on the cone of a hardfacing composition of carbide particles dispersed in an iron-based matrix wherein iron comprises a primary metal of the iron-based matrix.

* * * * *